United States Patent
Dev et al.

(10) Patent No.: US 10,057,870 B2
(45) Date of Patent: Aug. 21, 2018

(54) COMMUNICATION DEVICE AND A METHOD FOR OPERATING A COMMUNICATION DEVICE

(71) Applicant: Intel IP Corporation, Santa Clara, CA (US)

(72) Inventors: Rishav Dev, Bangalore (IN); Vinay Warde, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 98 days.

(21) Appl. No.: 15/088,179

(22) Filed: Apr. 1, 2016

(65) Prior Publication Data

US 2017/0289958 A1 Oct. 5, 2017

(51) Int. Cl.
- H04W 4/00 (2018.01)
- H04W 60/00 (2009.01)
- H04W 48/20 (2009.01)
- H04W 68/00 (2009.01)

(52) U.S. Cl.
CPC ........... *H04W 60/00* (2013.01); *H04W 48/20* (2013.01); *H04W 68/005* (2013.01)

(58) Field of Classification Search
CPC ... H04W 72/1247; H04W 4/02; H04W 48/06; H04L 5/001; H04L 5/0035
USPC .......................................................... 370/329
See application file for complete search history.

(56) References Cited

U.S. PATENT DOCUMENTS

| | | | |
|---|---|---|---|
| 6,385,460 B1 * | 5/2002 | Wan | H04W 52/0229 455/434 |
| 2009/0215452 A1 | 8/2009 | Balasubramanian et al. | |
| 2010/0240386 A1 * | 9/2010 | Hamabe | H04W 72/04 455/452.2 |
| 2010/0255843 A1 | 10/2010 | Huang et al. | |
| 2011/0077003 A1 | 3/2011 | Shin | |

(Continued)

FOREIGN PATENT DOCUMENTS

| | | |
|---|---|---|
| WO | 2012142166 A1 | 10/2012 |
| WO | 2015069601 A1 | 5/2015 |

OTHER PUBLICATIONS

3GPP TS 36.304 V13.1.0, 3rd Generation Partnership Project, Technical Specification Group Radio Access Network, Evolved Universal Terrestrial Radio Access (E-UTRA), User Equipment (UE) procedures in idle mode; Section 5.2.3.2, Mar. 2016, pp. 18-19, Release 13, 3GPP, Valbonne, France.

(Continued)

*Primary Examiner* — Chi H Pham
*Assistant Examiner* — Alexander O Boakye
(74) *Attorney, Agent, or Firm* — Viering, Jentschura & Partner mbB (57) ABSTRACT

A method and device for decreasing the frequency of tracking area update (TAU) procedures triggered by cell reselections in LTE idle mode without sacrificing paging reception success rate consisting of identifying a frequency of a camped cell in LTE idle mode of a first SIM; assigning the current frequency a highest priority irrespective of the system information blocks (SIBs) broadcast by the network; and remaining on the current frequency until: a cell selection reception level value of the camped cell is less than a first predetermined threshold value or a cell selection quality value of the camped cell is less than a second predetermined threshold value.

23 Claims, 8 Drawing Sheets

(56) References Cited

U.S. PATENT DOCUMENTS

2011/0319080 A1* 12/2011 Bienas ................ H04W 36/30
 455/436
2012/0108273 A1* 5/2012 Lee ...................... H04W 68/02
 455/458

OTHER PUBLICATIONS

International Search Report based on application No. PCT/US2017/019254 (16 pages) dated Jul. 24, 2017 (Reference Purpose Only).

* cited by examiner

COMMUNICATION DEVICE AND A METHOD FOR OPERATING A COMMUNICATION DEVICE

TECHNICAL FIELD

Various aspects of this disclosure relate generally to a method and a device for mobile communications.

BACKGROUND

In long-term evolution (LTE) communications, when the user equipment (UE) is in the idle state, i.e. not communicating with the LTE network, the UE's location is known to the LTE network on a tracking area (TA) level. An operator may define any number of base stations of the LTE network, known as evolved Node Bs (eNodeB or eNB for short), as belonging to a particular TA. In short, each eNB and its corresponding coverage area (i.e. cell) is configured with a particular TA at the network deployment stage. Each TA can consist of multiple cells and is defined as a group of cells (or a single cell) which the mobility management entity (MME) may use to locate the UE.

Each TA has a unique tracking area identity (TAI) consisting of the public landline mobile network identity (PLMN-ID) and the TA code (TAC). Cells which are grouped into the same TA are identified in the system broadcast parameters by a TAI. When registering with the network, the UE receives a TAI list. The TAI list includes the TAs for which the UE does not need to perform tracking area update (TAU) procedures. If a TA is not on the TAI list, however, the UE needs to perform a TAU procedure in order to inform the MME of its new location upon reselecting to the new cell.

In a dual subscriber identity model (SIM) platform utilizing a single shared transmitter, this may prove to be problematic whenever one SIM is in idle mode in LTE and the other SIM is actively operating in any other mode using the transmitter (i.e. 2G, 3G, LTE, etc.), e.g. a voice call. Because an LTE uplink transmission is required for TAU and there is only one transmitter available for the UE, the active communication (e.g. voice call) may be interrupted in order for the UE to perform the TAU procedure because the TAU procedure is prioritized for the UE to successfully receive paging from the network.

Furthermore, multiple TAUs may be performed during UE mobility. Because of the prioritization to perform the TAUs on one of the SIMs in a dual-SIM, single transmitter UE, there may be negative impact on an active communication of the second SIM such as: loss of uplink transmission as the LTE uplink transmission degrades the quality of active communications, more retransmissions leading to increased power consumption, and signaling packet loss resulting in active call drop or connection release for the second SIM.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which.

DESCRIPTION

The following detailed description refers to the accompanying drawings that show, by way of illustration, specific details and aspects of the disclosure which may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel, e.g. frequency. There can be multiple cells on a single frequency. Each base station provides a cell with a specific ID, known as a cell ID. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving mobile terminal operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component)

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

In an exemplary scenario, for a dual SIM platform utilizing a single shared transmitter, the LTE evolved radio resource control (eRRC) of one of the two SIMs (SIM1 for example) may be in idle mode and camped on a cell (e.g. C1) of a low priority frequency as indicated on the received system information block (SIB). A neighboring cell (C2) may fulfill the cell reselection criteria, but C2 may not belong to the same TAI of the current camped cell, C1.

Meanwhile, on the other SIM (SIM2 for example), there may be an ongoing 2G/3G CS voice call.

Under the existing 3$^{rd}$ Generation Partnership Project (3GPP) procedure, the UE will reselect to the neighboring cell C2. The evolved non-access stratum (eNAS) of the LTE protocol stack on the UE initiates the TAU procedure, which includes at least one uplink transmission. Because the eNAS initiates the TAU procedures on SIM1, the ongoing 2G/3G CS voice call on SIM2 is interrupted, leading to poor voice quality and additional power consumption due to the increase in signaling.

In an aspect of this disclosure, the UE considers the current communication channel (for example, a frequency (F1) of cell (C1)) of SIM1 to be the highest priority (i.e. the highest than eight network configured values), irrespective of the priority listed in the SIBs. Furthermore, the UE will remain on the current communication channel (for example, F1 on C1) until the cell selection reception level value (Srxlev) or the cell selection quality value (Squal) falls below a certain threshold, e.g. 3 decibels (dBs), e.g. 5 dBs. As a result, the eNAS will not initiate the TAU procedures until either the Srxlev or the Squal of the current cell (e.g. C1) degrades to point which is no longer effective for paging. This results in a reduction in the interruptions of the ongoing call on SIM2. Additionally, the power consumption of the UE is reduced due to less control signaling.

Figure 1:
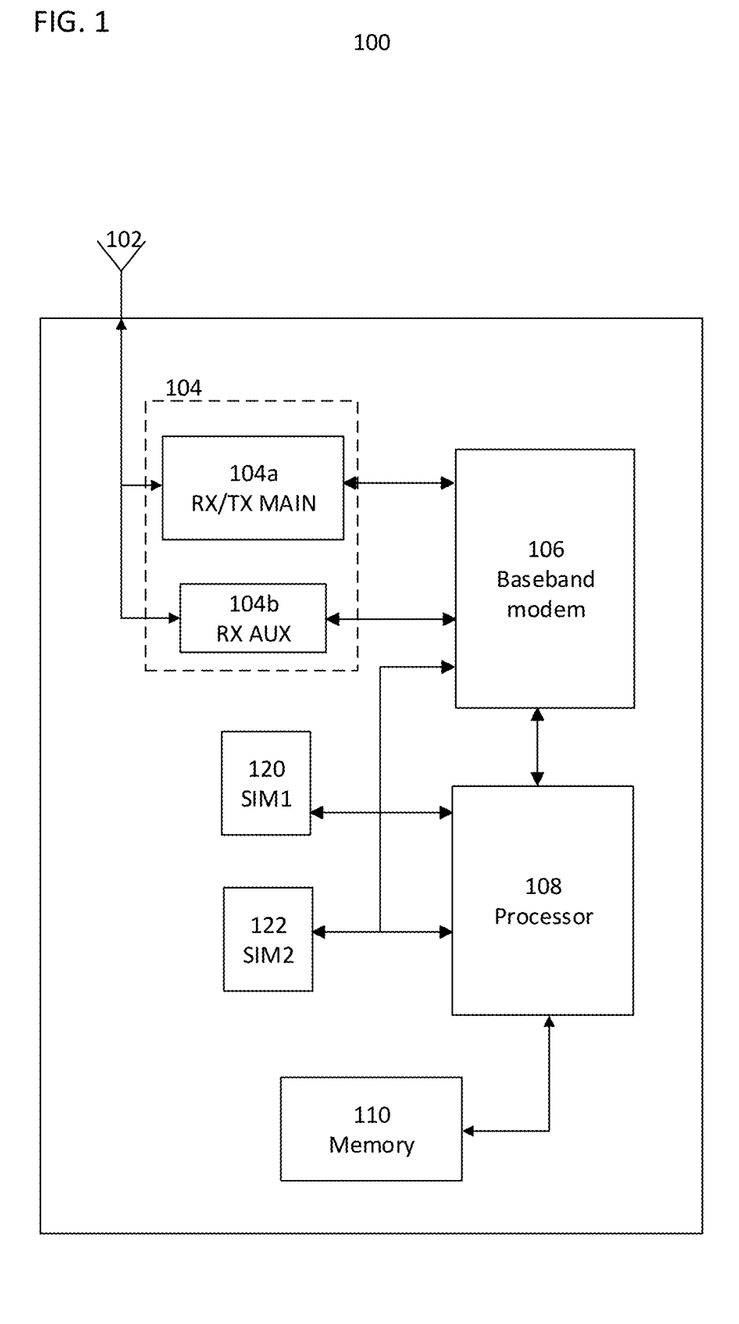
FIG. 1 shows a communication device in an aspect of this disclosure.

FIG. 1 shows a UE 100 according to one aspect of this disclosure. UE 100 is configured to suppress a LTE TAU procedure on a first SIM until the Srxlev or the Squal values of the current LTE cell that the first SIM is camped on fall below certain threshold values. UE 100 is further configured to decrease the frequency of triggered TAU procedures due to inter-TA cell reselections in LTE idle mode without sacrificing paging reception success rate. It is appreciated that UE 100 is exemplary in nature and may thus be simplified for purposes of this explanation.

As shown in FIG. 1, UE 100 may include an antenna 102, a radio frequency (RF) unit 104 consisting of a reception/transmission main (RX/TX) unit 104a and reception auxiliary (RX AUX) unit 104b, baseband modem 106, application processor 108, a memory component 110, and two SIMs 120, 122.

These components may be implemented as separate components; however, it is appreciated that the configuration of UE 100 is for purposes of explanation, and accordingly, one or more of the aforementioned components of UE 100 may be integrated into a single equivalent component or divided into multiple components with collective equivalence. It is also appreciated that UE 100 may have one or more additional components, such as hardware, software, or firmware elements. For example, UE 100 may also include various additional components including processors, microprocessors, at least one power supply, peripheral device(s) and other specialty or generic hardware, processors, or circuits, etc., in order to support a variety of additional operations. For example, UE 100 may also include a variety of user input/output devices, such as display(s), keypad(s), touchscreen(s), speaker(s), microphone(s), button(s), camera(s), etc.

In an overview of the operation of UE 100, mobile terminal 100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of UE 100 may be shared between different wireless access protocols, such as, for example, by sharing an antenna 102 between multiple different wireless access protocols or RATs. In an exemplary aspect of this disclosure, RF unit 104 and/or baseband modem 106 may operate according to multiple communication access protocols (i.e. "multi-mode"), and thus may be configured to support one or more of LTE, GSM, and/or UMTS access protocols.

Furthermore, RF unit 104 may receive frequency wireless signals via antenna 102, which may be implemented as, for example, a single antenna or an antenna array composed of multiple antennas. RF unit 104 may include various reception circuitry elements, for example, analog circuitry configured to process externally received signals, such as circuitry to convert externally received RF signals to baseband and/or intermediate frequencies. RF unit 104 may also include amplification circuitry to amplify externally received signals, such power amplifiers and/or Low Noise Amplifies, although it is appreciated that such components may also implemented separately. RF unit 104 may additionally include various transmission circuit elements configured to transmit signals, such as, for example, baseband and/or intermediate frequency signals provided by the baseband modem 106, which may include mixing circuitry to modulate signals onto one or more radio frequency carrier waves and/or amplification circuitry to amplify internal signals before transmission. The RF unit 104 may provide such signals to antenna 102 for wireless transmission. Although not explicitly depicted in FIG. 1, RF unit 104 may be additionally connected to processor 108.

RF unit 104 may consist of a RX/TX unit 104a and RX AUX unit 104b. Because the RF unit 104 has two receiver units (one in the RX/TX unit 104a and one in the RX AUX unit 104b) UE 100 is capable of receiving two separate transmissions concurrently. For example, SIM1 120 may be receiving an evolved Multimedia Multicast Service (eM-BMS) stream on an LTE network while SIM2 122 places a phone call on 2G or 3G.

Since UE 100 has only one transmitter in the RF unit 104, i.e. the transmitter in the RX/TX MAIN 104a, UE 100 may not be capable of transmitting two communications on different communication channels concurrently. For example, if SIM2 122 is on an active circuit switched (CS) call on either 2G/3G and SIM1 120 is in LTE idle mode, a cell reselection of SIM1 120 to a new tracking area not on the UE's 100 TAI list will trigger a TAU procedure. This could potentially degrade the active communication on SIM2 122. In order to avoid this problem, the baseband modem 106 is configured to allow the UE to remain on the currently camped LTE cell until the Srxlev or the Squal of the currently camped LTE cell fall below certain threshold values, irrespective of the priority broadcasted by the system information blocks (SIBs) of the network.

Baseband modem 106 may include one or more digital processing circuits and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 106 and may also be partially or fully integrated with the digital processing circuitry.

The baseband modem 106 may be configured to operate one or more protocol stacks, such as a GSM protocol stack, an LTE protocol stack, a UMTS protocol stack, etc. or any combination thereof. Baseband modem 106 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 106 may be configured to control one or more further components of mobile terminal 100. The protocol stack(s) of baseband modem 106 may be configured to control operation of the baseband modem 106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

In a first exemplary aspect of the disclosure, the baseband modem is configured to consider the current frequency of a camped on cell (i.e. LTE cell) to be of the highest priority, irrespective of the priority broadcasted by the SIBs. The baseband modem is further configured to remain on the current LTE cell until the Srxlev or the Squal fall below a threshold value, e.g. 5 dBs, e.g. 3 dBs, etc.

In a second exemplary aspect of the disclosure, the baseband modem is configured to suppress a TAU procedure on a first SIM triggered by a cell reselection while an active communication, e.g. a voice call on either 2G, 3G, LTE, etc., is taking place on the second SIM. The baseband modem suppresses the TAU procedure on the first SIM until the cell selection reception level value or the cell selection quality value of the current camped LTE cell of the first SIM falls below a certain threshold, e.g. 5 dBs, e.g. 3 dBs, etc. In this manner, the frequency of TAUs due to inter-TA cell reselections in LTE idle mode is decreased without sacrificing paging reception success rate.

The application processor 108 may be implemented as a Central Processing Unit (CPU), and may function as a controller of mobile terminal 100. The application processor 108 may be configured to execute various applications and/or programs of mobile terminal 100, such as, for example, applications corresponding to program code stored in a memory component of mobile terminal 100 (not shown in FIG. 1). The application processor 108 may also be configured to control one or more further components of mobile terminal 100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 106 and application processor 108 are depicted separately in FIG. 1, it is appreciated that the figure is not limiting in nature. It is understood that the baseband modem 106 and the application processor 108 may be implemented separately, implemented together (i.e. as an integrated unit), partially implemented together, etc.

In an aspect of this disclosure, the above processes can also be applied to a communication device with two or more transmitters. So while there would be no interruption in the active communication during a TAU procedure, for example, the UE would be able to conserve power as there would be less signaling involved.

Figure 2:
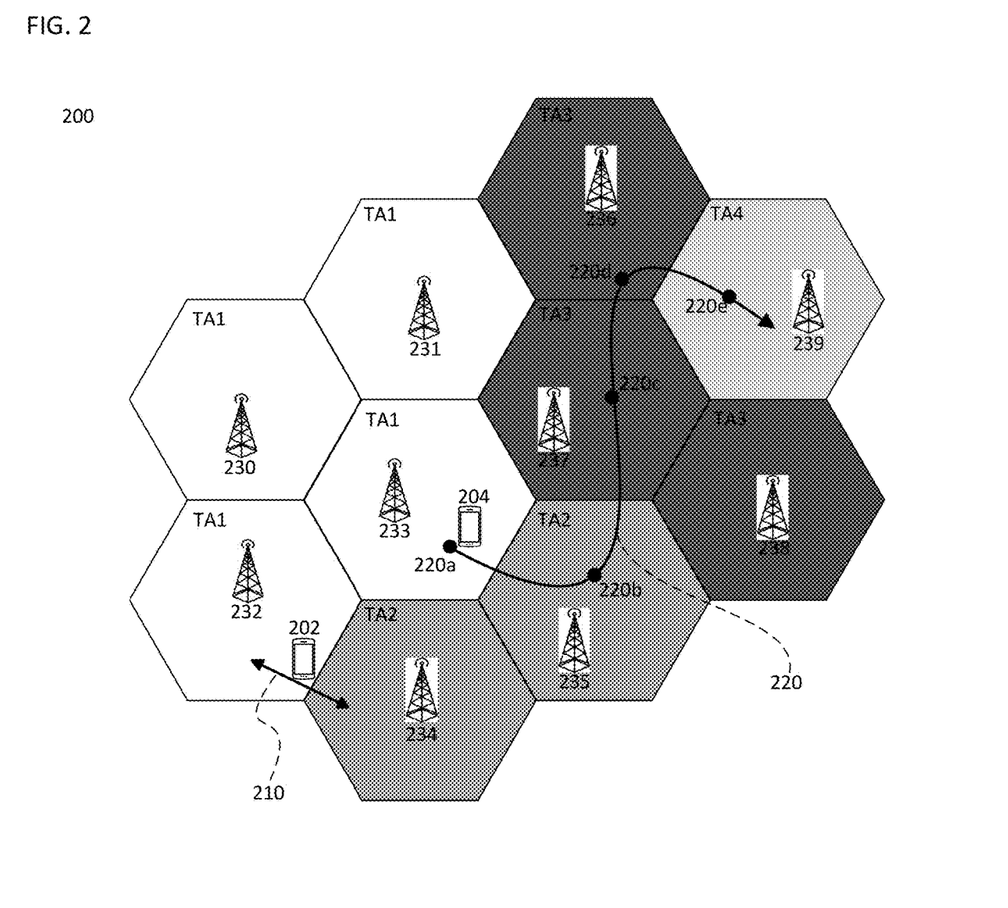
FIG. 2 shows a communication network in an aspect of this disclosure.

FIG. 2 shows a communication network 200 in which an aspect of this disclosure is applied. It is appreciated that communication network 200 is exemplary in nature and thus may be simplified for purposes of this explanation.

Communication network 200 consists of a series of cells which are shown as hexagons in FIG. 2. Each cell may have at least one base station 230-239 (e.g. an eNB) serving the cell. Each base station 230-239 is associated with a radio access section of communication network 200, i.e. the Radio Access Network (RAN) of mobile communication network 200. The base stations may thus act as an interface between the RAN of mobile communication network 200 and an underlying core network of mobile communication network 200, and may allow any proximate UE, e.g. UE 202 or 204, to exchange data with the core network of mobile communication network 200 and any further networks connected thereto.

Each of base stations 230-239 may respectively provide mobile communication coverage to each its coverage regions, which may correspond to a single cell (i.e. sector) of a respective one of base stations or may be composed of multiple cells (i.e. sectors) of a respective one of base station. As shown in FIG. 2, for example, UE 202 may be physically located within a coverage region of base station 232. It is appreciated that although the coverage regions (i.e. the cells) are depicted as having distinct boundaries, it is understood that one or more of coverage regions may overlap, and accordingly there may exist geographical regions served by two or more of base stations 230-239.

Communication Network 200 may be configured in accordance with the network architecture of any one of, or any combination of, LIE (Long Term Evolution), WLAN (wireless local area network), WiFi, UNITS (Universal Mobile Telecommunications System), GSM (Global System for Mobile Communications), Bluetooth, CDMA (Code Division Multiple Access), Wideband CDMA (W-CDMA), etc. Accordingly, base stations 230-239 may be configured to provide an interface for communication devices, such as UE 202 and 204; to connect with any of the aforementioned network architectures.

As shown in communication network 200, base stations 230-233 (and their corresponding cells) are a part of tracking area 1 (TA1), base stations 234-235 (and their corresponding cells) are a part of tracking area 2 (TA2), base stations 236-238 (and their corresponding cells) are a part of tracking area 3 (TA3), and base station 239 (and corresponding cell) is a part of tracking area 4 (TA4). Communication network 200 shows a typical network topology and possible UE movements through multiple tracking areas (TAs).

In a first explanation of the movement of UE 204, it is assumed that each cell is best served by its respective base station.

UE 204 movement through communication network 200 is demonstrated by path 220 and positions 220a-220e along path 220. From 220a to 220b, UE moves from TA1 to TA2. If TA2 is no on UE's 204 TAI list, UE 204 will perform a TAU procedure. Similarly, when UE 204 moves from 220b to 220c, UE 204 will need to perform a TAU procedure if TA3 is not on the TAI list. However, when UE 204 moves from 220c to 220d, UE will not need to perform a TAU procedure since it is still within TA3. Once UE 204 moves to 220e, it will have moved into TA4, and will need to perform a TAU if TA4 is not on its TAI list.

In a second exemplary scenario, UE 204 may perform a TAU update at 220a if the cell served by base station 235 fulfills the cell reselection criteria and is of higher priority than then cell served by base station 233. In other words, UE 204 will reselect to the cell served by base station 235 at point 220a if the cell served by base station 235 is on a higher priority frequency than the cell served by base station 233 (as indicated by the SIBs broadcasted by the network) and the cell reselection criteria is fulfilled.

Another exemplary UE movement through communication network 200 is shown for UE 202. As shown by path 210, UE 202 may 'ping pong' back and forth between the cells served by base station 232 and 234. Since these cells are in different tracking areas, TA1 and TA2, respectively, UE 202 may need to perform a TAU procedure for each cell reselection between the two.

Under the current 3GPP standards, each time UE 202 or 204 moves into a cell with a new tracking area, or detects a cell with a new tracking area that fulfills the cell reselection criteria, UE 202 or 204 performs a TAU if the new TA is not on the TAI list that the UE acquired when it registered with the network. Consequently, there is an increase in control signaling which leads to an increase in power consumption. This can prove to be especially problematic if the UE is on an active communication (e.g. a voice call on 2G, 3G or VoLTE) on another SIM and the UE only has one transmitter.

In an aspect of this disclosure, the UE 204 will always consider the current LTE frequency, i.e. the current camped LTE cell, to be of the highest priority and will remain on the current LTE cell until either the Srxlev or the Squal fall below a certain threshold value. As a result, for example, when UE 204 is at point 220a and camped in idle mode on the LTE cell served by base station 233, it will not attempt to reselect to the LTE cell served by base station 235 even if the LTE cell served by base station 235 fulfills the cell reselection criteria and is of higher priority as broadcasted by the SIBs. Similarly, when UE 204 moves to point 220b, it will remain camped in idle mode on the cell served by base station 233 as long as the cell's Srxlev or Squal are still above the threshold values. As a result, if there is an ongoing communication, e.g. 2G/3G voice call, on another SIM of UE 204 and UE 204 has a single transmitter, there will be no interruption or loss in quality in the ongoing communication, e.g. 2G/3G voice call. Additionally, there will less control signaling, resulting in a decrease in power consumption of the UE.

Figure 3:
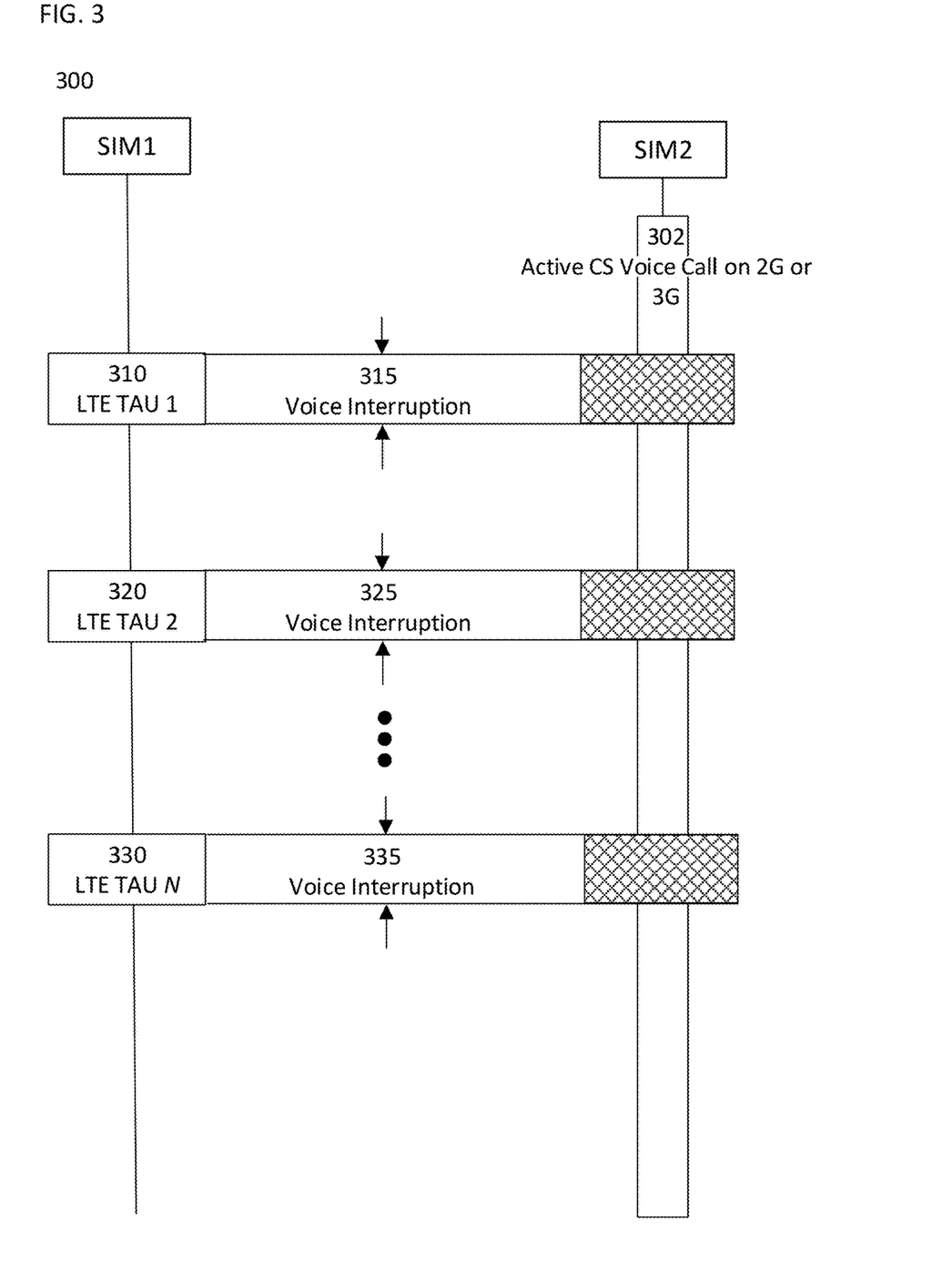
FIG. 3 shows an exemplary scenario depicting possible interruptions in a voice call due to LTE TAU procedures under 3GPP procedures.

FIG. 3 shows a chart 300 depicting possible scenario in which an active communication 302, e.g. CS voice call on 2G or 3G, on one SIM, i.e. SIM1, is interrupted by multiple TAU procedures on a second SIM, i.e. SIM2, under the existing 3GPP procedures. It is appreciated that chart 300 is exemplary in nature and may thus be simplified for purposes of this explanation.

Chart 300 shows a scenario in which a user on a communication device with dual-SIMs and one transmitter experiences interruptions 315, 325, 335 on an active voice call 302 on a first SIM (SIM1) while the second SIM (SIM2) is in LTE idle mode performing TAU 310, 320, 330. For example, during voice call 302, the user may move from a first LTE cell (C1) to another LTE cell (C2) which is not on its TAI list. As a result, the UE will perform a LTE TAU 310, resulting in voice interruption 315.

In another example, during a voice call 302 on SIM1, UE is camped on the newly selected LTE cell (C2) in idle mode. The UE may detect a neighboring LTE cell (C3) which fulfills the cell reselection criteria and is of higher priority than its currently camped LTE cell (C2), but is not on the TAI list. Consequently, UE will attempt a LTE TAU in order to reselect to C3 on SIM2 320, resulting in another voice interruption 325 of the active voice call on SIM1.

During voice call 302, there may be multiple TAUs, up to N times 330, leading to N voice interruptions 335. Furthermore, depending on the quality of the LTE coverage, there may be more frequent and longer interruptions.

Figure 4:
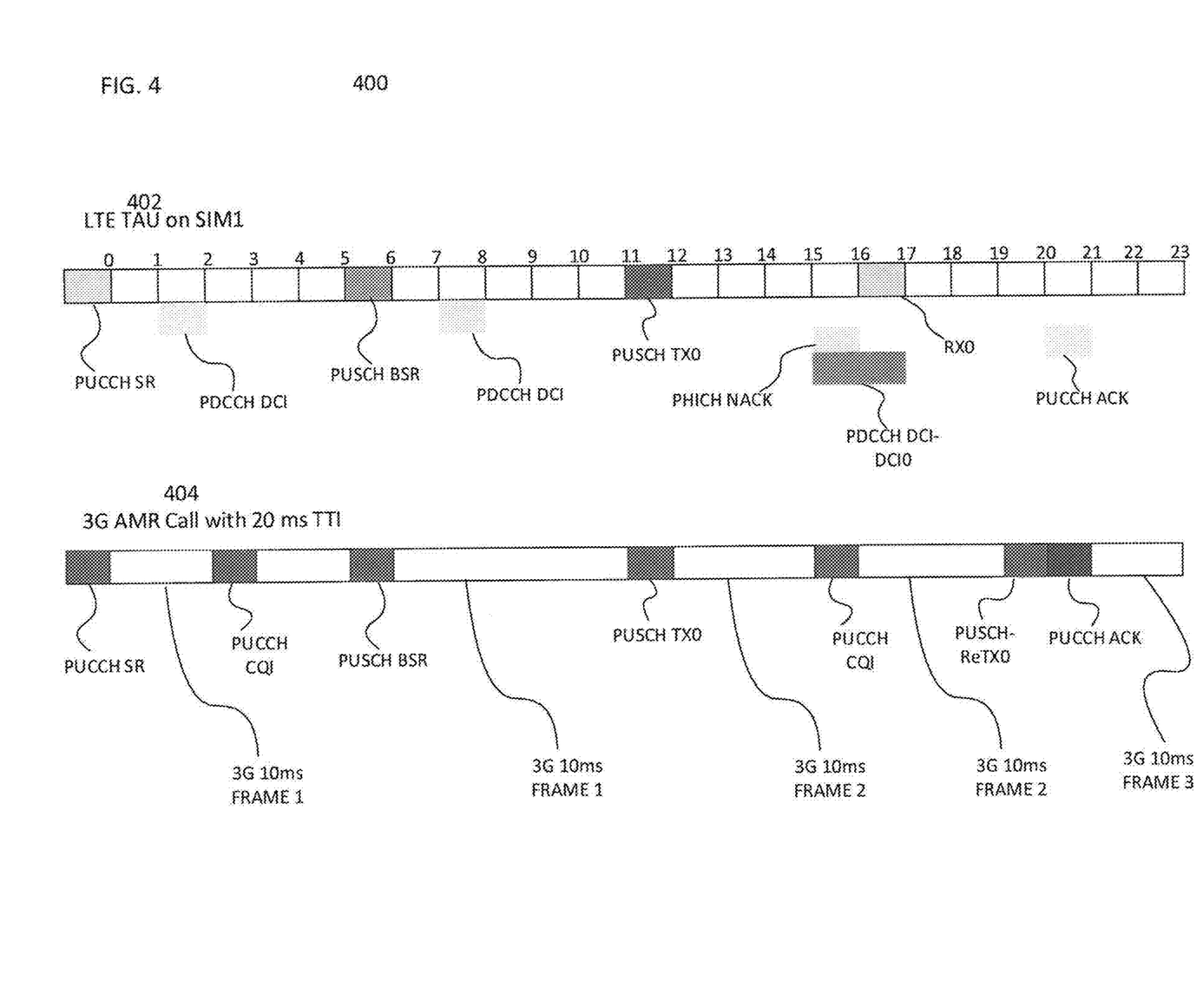
FIG. 4 shows an exemplary scenario in which LTE uplink transmissions interrupt a voice call under 3GPP procedures.

FIG. 4 shows an exemplary scenario 400 demonstrating a sequence of LTE transmissions on a first SIM (SIM1) 402 as a result of TAU and its effect on an active communication on a second SIM (SIM2) 404. The uplink (UL) transmissions of the LTE TAU procedure 402 are represented by the shaded boxes in the uplink bar for 402 while the downlink (DL) transmissions are represented under the uplink bar for 402 (e.g. the PDCCH DCI). An ongoing 3G adaptive multi-rate (AMR) call 404 with 20 ms Transmission Time Interval (TTI) is taking place on a SIM2. It is appreciated that FIG. 4 is exemplary in nature and may thus be simplified for purposes of this explanation. It is important to note the dynamic nature of LTE resource scheduling and cell conditions decides the amount of UL transmissions.

Due to the nature of LTE uplink channels, i.e. the physical uplink control channel (PUCCH), the physical uplink shared channel (PUSCH), the sounding reference signal (SRS), and the physical random access channel (PRACH), LTE UL transmission are spread in the time domain, where each UL transmission is associated to a 1 millisecond (ms) TTI. LTE UL resource allocation procedure based on a Scheduling Request (SR) and buffer status reports (BSR) may be required before every UL transmission on PUSCH after the radio resource control (RRC) connection is established. Apart from data transmission in UL, LTE signals, such as SRS, for link maintenance are also transmitted by the UE.

More interruptions due to a TAU procedure may be possible if more than one UL hybrid automatic repeat request (HARQ) process is allocated by the network for UL transmission during TAU procedure. Also, in poor cell conditions, multiple HARQ or radio link control (RLC) retransmissions are possible in UL and downlink (DL), which may add more interruptions and prolong the TAU procedure time $T_j$, where j is any number from 1 to N. The Physical downlink control channel (PDCCH), for example may send downlink control indicators (DCI) to indicate to the UE which resource blocks carry data and what kind of demodulation scheme is needed to decode the data. Additionally, the eNB may send downlink control channel information format 0 (DCI0) messages on the PDCCH to instruct the UE when and where it should transmit. The TAU transmission request (TX0) and the completion of the reception (RX0) of the TAU request are indicated in slots 12 and 17, respectively.

The effects of the LTE TAU on SIM 1 402 causes the 3G AMR call on SIM2 404 to experience a series of interruptions, indicated by the shaded areas along the bar of 404. FIG. 4 shows a simple LTE resource allocation, i.e. only one HARQ process is used in the UL. This is evident as only one HARQ process is shown in FIG. 4. It can be seen that even for the simplest LTE resource allocation by the network, many LTE control channels (i.e. PUCCH, PUSCH, etc.) interrupt the 3G AMR call. The PUCCH channel quality indicator (CQI) carries the information concerning the quality of the communication channel. In this example, there is also a PUSCH retransmission (ReTX0) interruption. Due to such interruptions, the cyclic redundancy check (CRC) decoding would most likely fail on the 3G nodeB, thus degrading the audio quality of the call.

In an aspect of this disclosure, the problems depicted by FIG. 3 and FIG. 4 are reduced, or altogether eliminated, leading to an increase in quality of the ongoing voice call on the other SIM and a decrease in power consumption.

Figure 5:
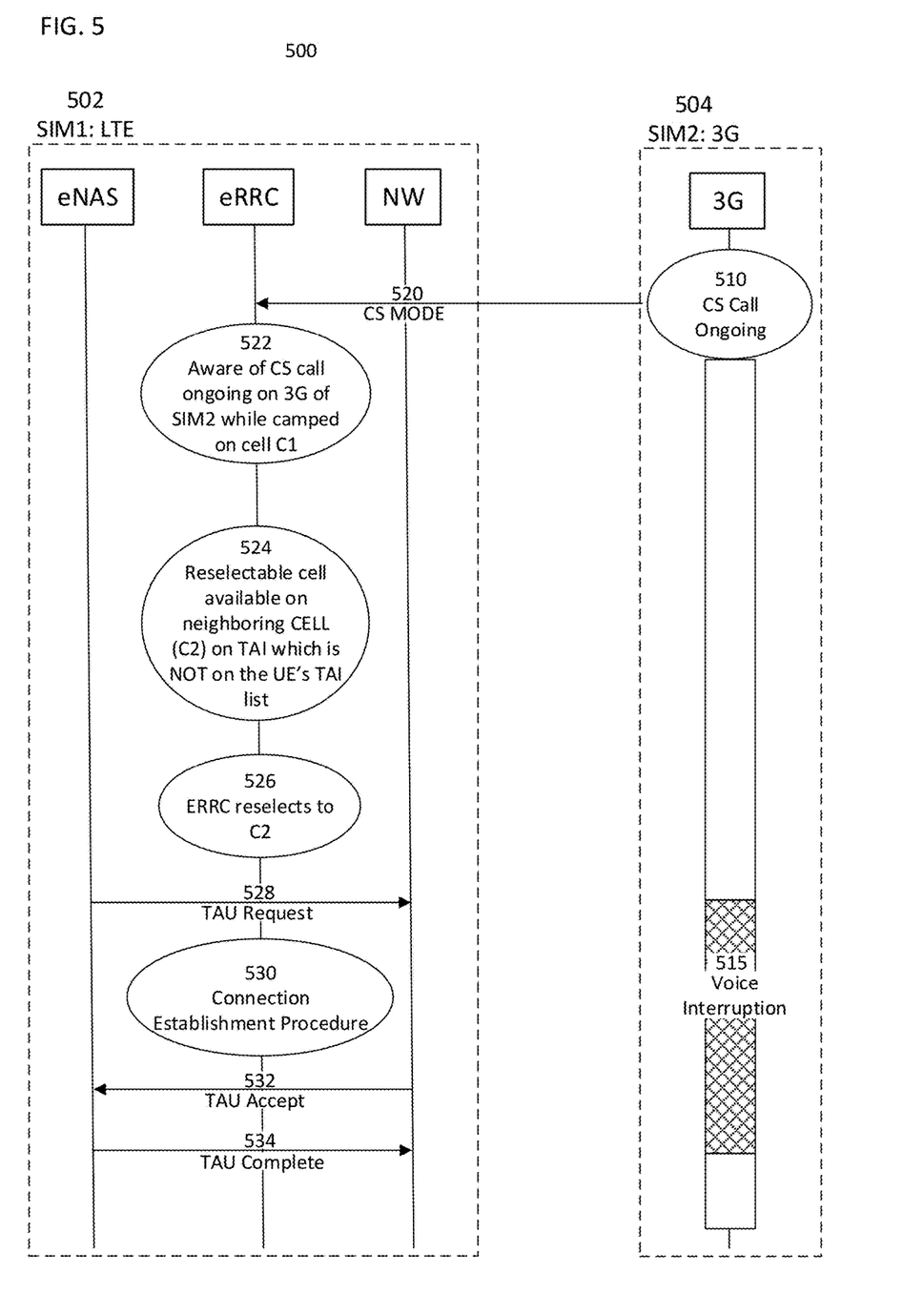
FIG. 5 shows a message sequence chart (MSC) with interruptions in a first communication under 3GPP procedures.
Figure 6:
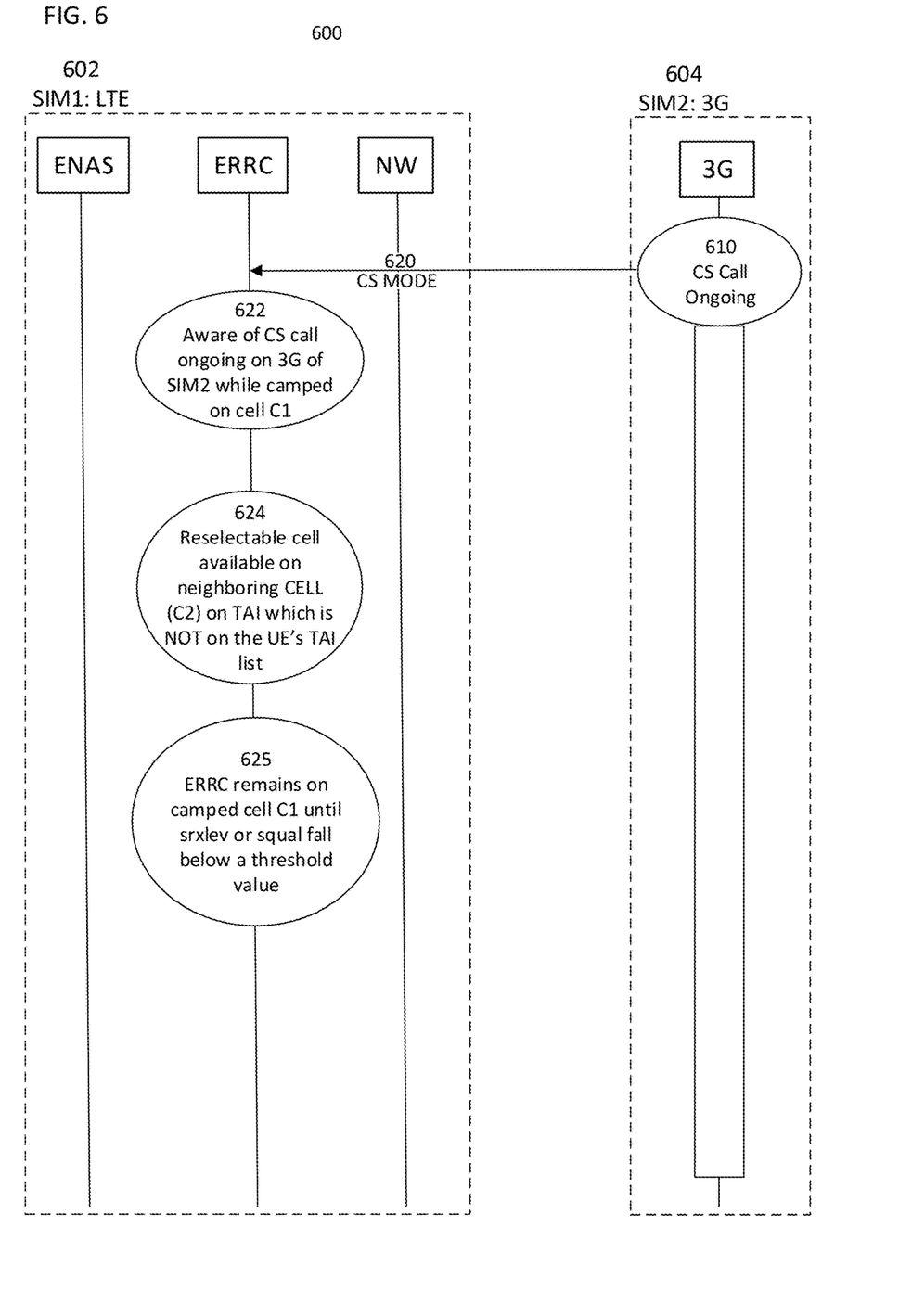
FIG. 6 shows a MSC in an aspect of this disclosure.

FIGS. 5 and 6 show message sequence charts (MSCs) 500 and 600, respectively, of a dual-SIM and single transmitter UE. MSC 500 shows the current procedure as implemented by 3GPP procedure. MSC 600 shows the procedure implemented in an aspect of this disclosure. It is appreciated that MSCs 500 and 600 are exemplary in nature and may thus be simplified for purposes of this explanation.

In MSC 500, a first SIM of the UE, SIM1, operates in LTE mode and is depicted by the area outlined by 502. A second SIM of the UE, SIM2, operates on a different RAN than SIM1, e.g. in 3G, and is depicted by the area outlined by 504. In this example, SIM2 is shown on a 3G RAN, however, it is important to note that SIM2 may be operating on any other RAN, e.g. a 2G RAN, a different LTE RAN than SIM1, etc.

The components within the LTE area are the evolved non-access stratum (eNAS), the evolved radio resource control (eRRC), and the LTE network (NW).

As shown in MSC 500, when a CS call is established 510 on SIM2 operating in 3G, a message 520 is sent to the eRRC that the UE is operating in CS mode. This way, the eRRC is aware of the CS call that is ongoing on 3G of SIM2 522 while it is camped in idle mode on a first LTE cell (C1).

In 524, a reselectable neighboring cell (C2) becomes available (e.g. the UE detects the neighboring cell, C2) with a TAI that is not on the UE's TAI list. Under 3GPP procedures, the eRRC will automatically initiate reselection procedures to reselect to C2 526. The eNAS sends a TAU request 528 to the NW to inform the MME about a change in tracking area (TA). This commences the RRC connection establishment procedure 530. TAU request 528 is an uplink transmission from the UE which results in a voice interruption 515 on the ongoing CS call on SIM2.

Once the NW accepts the TAU with a TAU accept message 532, the eNAS sends another transmission to the NW that the TAU is complete 534. The voice interruption 515 on the ongoing call in CS 510 may last for the entire duration from the TAU request 528 until the uplink transmission from the UE indicating that the TAU is complete 534.

FIG. 6 shows an MSC 600 which mitigates, or altogether eliminates, the voice interruption shown in MSC 500 in an aspect of this disclosure.

A message sequence of a first SIM operating on LTE, SIM1, is shown by the area outlined by 602, while an ongoing call on a 3G RAN on a second SIM, SIM2, is shown by the area outlined by 604. In this example, SIM2 is shown on a 3G RAN, however, it is important to note that SIM2 may be operating on any other RAN, e.g. a 2G RAN, a different LTE RAN than SIM1, etc.

In 610, a CS voice call is established on 3G of SIM2. A communication is sent to the eRRC of SIM1 about the CS call in 620 so that the eRRC is aware of the ongoing call on SIM2 622. In this manner, the eRRC is aware of the CS call that is ongoing on 3G of SIM2 while it is camped in idle mode on a camped LTE cell (C1).

At 624, a reselectable neighboring cell (C2) becomes available (e.g. the UE detects the neighboring cell, C2) with a TAI that is not on the UE's TAI list it acquired when it registered with the NW (acquisition of the TAI list not shown). Here, unlike under the 3GPP procedures as shown in MSC 500, the eRRC remains camped on cell C1 until the Srxlev or the Squal level fall below predetermined threshold values 625. In one aspect of this disclosure, the predetermined threshold value for the Srxlev and the Squal may be the same value, e.g. 3 dBs or 5 dBs, or any similar number. The predetermined threshold values may be optimized through testing protocols.

Because the eRRC remains camped on the current camped cell C1 625, there are no uplink transmissions from the SIM1 of the UE in the TAU procedure. This means that the single transmitter of the UE is used for the ongoing call on SIM2, resulting in no voice interruptions of the call.

The Srxlev is defined as:

$$Srxlev = Q_{rxlevmeas} - (Q_{rxlevmin} + Q_{rxlevminoffset}) - P_{compensation}$$

Where Srxlev is the cell selection reception value (dB), $Q_{rxlevmeas}$ is the measured cell reception level value (the reference signal received power), $Q_{rxlevmin}$ is the minimum required reception level in the cell (in decibel-milliwatts, dBm), $Q_{rxlevminoffset}$ is the offset to the signaled $Q_{rxlevmin}$ taken into account in the evaluation as a result of a periodic search for a higher priority public land mobile network (PLMN) while camped normally in a visited PLMN (VPLMN), and $P_{compensation}$ is the maximum of ($P_{EMAX} - P_{PowerClass}$) at 0 in dBs. $P_{EMAX}$ is the maximum transmission power level a UE may use when transmitting on the uplink in the cell (in dBm) defined as $P_{EMAX}$ in TS 36.101. $P_{PowerClass}$ is the maximum radio frequency output power of the UE (in dBm) according to the UE power class as defined in TS 36.101.

The Squal is defined as:

$$Squal = Q_{qualmeas} - (Q_{qualmin} + Q_{qualminoffset})$$

where Squal is the cell selection quality value (in dBs), $Q_{qualmeas}$ is the measured cell quality value (the reference signal received quality), $Q_{qualmin}$ is the minimum required quality level in the cell (in dBm), and $Q_{qualminoffset}$ is the offset to the signaled $Q_{qualmin}$ taken into account in the evaluation as a result of a periodic search for a higher priority PLMN while camped normally in a VPLMN.

Figure 7:
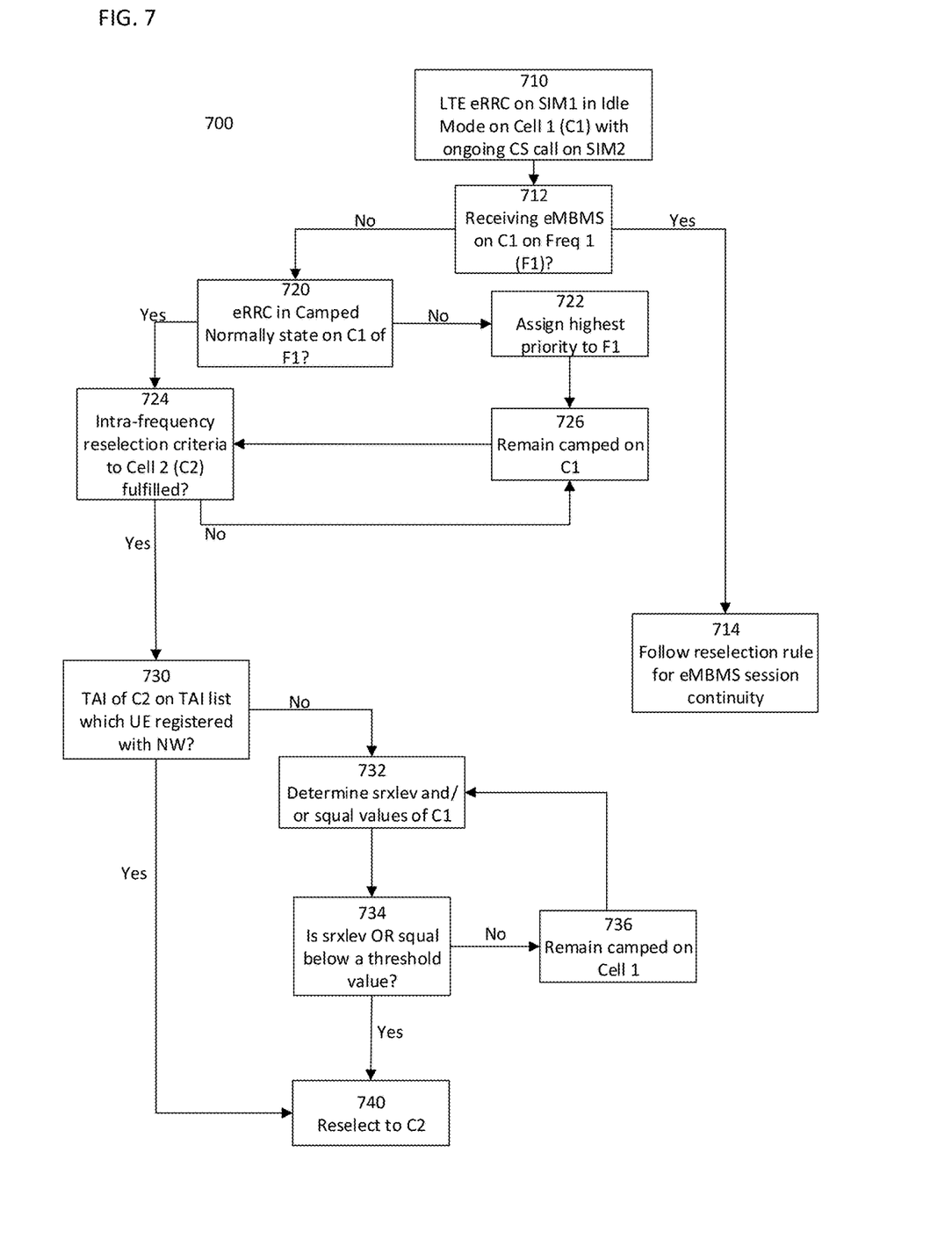
FIG. 7 shows a flowchart describing the process in an aspect of this disclosure.

FIG. 7 shows a flow diagram 700 describing an aspect of this disclosure in more detail for a dual-SIM, single transmitter UE. It is appreciated that flow diagram is exemplary in nature and may thus be simplified for purposes of this explanation.

The process commences with the LTE eRRC of SIM1 camped in idle mode on cell 1 (C1) while there is an ongoing call on SIM2 710. If the UE is receiving an evolved Multimedia Broadcast Multicast Service (eMBMS) on C1 on a frequency 1 (F1), then the UE will follow the 3GPP reselection rule for eMBMS session continuity 714. The priority rule for reselection in this case is that the eMBMS session has highest priority followed by a CS call on a dual SIM device, which means that reselection to any radio access technology (RAT) SIM is reduced to avoid interruption in voice call on the dual SIM device.

However, if the UE is not receiving eMBMS, the baseband modem of the UE must determine if the UE is in camped normally state on C1 of F1 720. In camped normally state, the UE obtains normal service and performs the tasks of selecting and monitoring the paging channel and paging indication channel of C1, performing system information monitoring, performing necessary measurements for the cell reselection evaluation procedure, and potentially executing the cell reselection evaluation procedure.

If the eRRC is not in camped normally state, the UE will assign the highest priority to the frequency (F1) of currently camped cell (C1) 722. Afterwards, the UE will remain camped on C1 726.

If the eRRC is in camped normally state on F1 of C1, the UE will perform necessary measurements for the cell reselection evaluation procedure to determine if the intra-frequency reselection criteria of a new cell (C2) is fulfilled 724. Similarly, if the eRRC was determined to not be in camped normally state and remain camped on C1, the neighboring frequency (F2) of the new cell may be evaluated to determine whether the UE will reselect to the new cell C2. The reselection criteria may comprise criteria pertaining to reselecting to another LTE cell, a closed group subscriber group (CSG) cell, or the like.

In any case, if the intra-frequency reselection criteria of C2 is not fulfilled, the UE will remain camped on C1. However, once the cell reselection criteria of C2 is fulfilled, the UE determines if the TAI of C2 is on the TAI list which the UE registered with the network (NW) 730. If the TAI of C2 is on the TAI list, then the UE can reselect to C2 740 without having to perform a TAU procedure, which would interrupt the ongoing call on SIM2. However, if the TAI is not on the TAI list, the UE will determine the srxlev and/or the squal values of C1.

If the determined values for srxlev and the squal are both above a their respective threshold value, e.g. 2 dBs, 3 dBs, 4 dBs, 5 dBs, etc., the UE will remain camped on C1 and not reselect to C2, thereby preserving the integrity of the phone call on SIM2. Only in the case for which either the srxlev or the squal fall below their respective threshold value will the UE reselect to C2 740. In this sense, the UE will remain camped on C1, and therefore preserve the integrity of the phone call on the other SIM while decreasing control signaling (and thereby reduce power consumption) until the quality of the reception of C1 degrades to a point in which it is no longer feasible to remain camped on the cell. So, if another cell not on the TAI list, such as C2, meets the reselection criteria and is of a higher priority as broadcasted by the SIBs, the UE will remain camped on the current cell C1 to mitigate the potential TAU interruptions.

Figure 8:
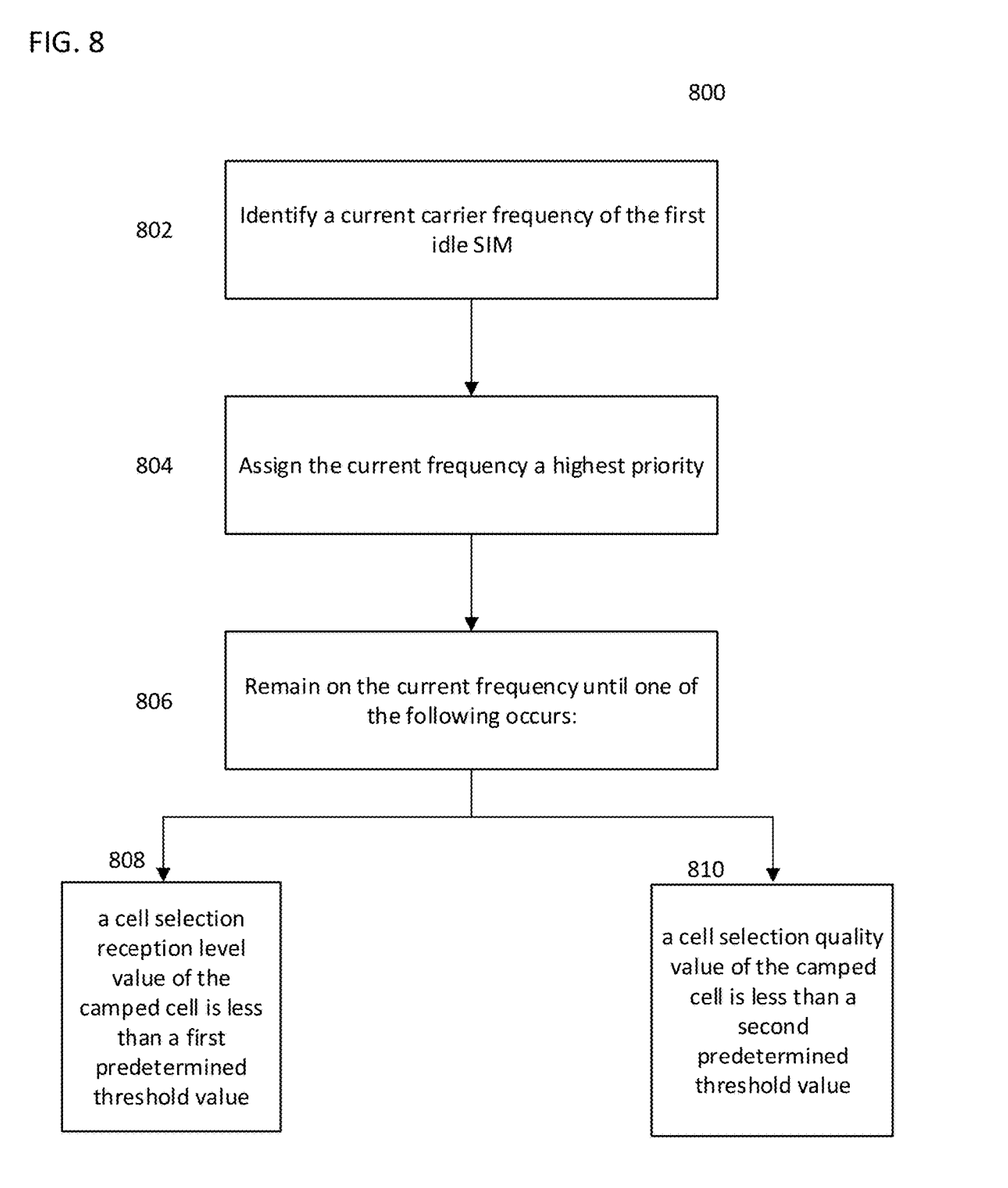
FIG. 8 shows a flowchart in an aspect of this disclosure.

FIG. 8 shows a flowchart 800 in an aspect of this disclosure. It is appreciated that flowchart 800 is exemplary in nature and may thus be simplified for purposes of this explanation.

In a typical exemplary scenario, flowchart 800 may be applied to a UE with dual-SIMs and a single transmitter. The first SIM may be camped in idle mode while the second SIM may be in an active communication, e.g. a 2G/3G phone call. The method of flowchart 800 may be employed in order to reduce, for example, the TAUs performed on the first SIM while the second SIM in an active communication.

In 802, the UE identifies the current frequency of a cell on which the first SIM is camped on. For example, this may comprise identifying frequency of the LTE cell that the first SIM is camped on in idle mode.

In 804, the UE will assign the current frequency channel identified in 802 a highest priority. The UE may do so irrespective of the information broadcasted by the network on the SIBS.

In 806, the UE will remain on the current frequency until one of the requirements of 808-810 are met. The predetermined threshold values discussed in 808 and 810 may be the same value, for example, 3 dBs, for example, 5 dBS, or they may be different values. The values are values which are chosen in order to maximize the efficacy of the methods implemented herein. For example, a value of 3 dBs may be considered the optimal threshold values for both 808 and 810 if it is the point at which the output power has dropped to half of its mid-band value.

In Example 1, a method for a communication device with at least one subscriber identity module (SIM) to suppress a cell reselection on a first SIM, comprising identifying a frequency of a cell on which the first SIM is camped on; assigning the frequency a highest priority; and remaining on the frequency until a cell selection reception level value of the cell is less than a first predetermined threshold value, or a cell selection quality value of the cell is less than a second predetermined threshold value.

In Example 2, the subject matter of Example 1 may include wherein the communication device comprises a radio frequency (RF) unit with a single transmitter.

In Example 3, the subject matter of Examples 1-2 may include an ongoing communication on a second SIM of the communication device.

In Example 4, the subject matter of Example 3 may include the ongoing communication utilizing the single transmitter of the communication device.

In Example 5, the subject matter of Examples 3-4 may include wherein the ongoing communication is a voice call.

In Example 6, the subject matter of Example 5 may include wherein the voice call is on a 2G or 3G radio access network (RAN).

In Example 7, the subject matter of Examples 1-6 may include wherein the first SIM is camped on an LTE cell.

In Example 8, the subject matter of Examples 1-7 may include assigning the frequency the highest priority irrespective of an information broadcasted by system information blocks (SIBs).

In Example 9, the subject matter of Examples 1-8 may include wherein the first SIM is in an idle mode on the frequency.

In Example 10, the subject matter of Examples 1-9 may include wherein the cell reselection comprises a tracking area (TA) cell reselection.

In Example 11, the subject matter of Examples 10 may include wherein the TA cell reselection triggers a TA update (TAU).

In Example 12, the subject matter of Examples 1-11 may include wherein the first predetermined threshold value is about 3 decibels (dBs) or fewer.

In Example 13, the subject matter of Examples 1-11 may include wherein the first predetermined threshold value is about 5 decibels (dBS) or fewer.

In Example 14, the subject matter of Examples 1-11 may include wherein the second predetermined threshold value is about 3 decibels (dBs) or fewer.

In Example 15, the subject matter of Examples 1-11 may include wherein the second predetermined threshold value is about 5 decibels (dBs) or fewer.

In Example 16, the subject matter of Examples 1-11 may include wherein the first predetermined threshold value and the second predetermined threshold value are the same value.

In Example 17, the subject matter of Examples 1-16 may include remaining on the frequency until the cell selection reception value of the cell is less than the first predetermined threshold value, the cell selection quality value of the cell is less than the second predetermined threshold value, or an identity of another detected cell is on an identity list that the communication device registered with the network, wherein the identity is a tracking area identity (TAI) and the identity list is a TAI list.

In Example 18, the subject matter of Examples 1-17 may include the frequency of the first SIM being in idle mode for a long term evolution (LTE) evolved radio resource control (eRRC).

In Example 19, a method for a communication device with at least one SIM to decrease the frequency of tracking area update (TAU) procedures for a first SIM in long term evolution (LTE) idle mode on a network, comprising assigning a frequency of a cell that a first SIM is camped on as a highest priority; and remaining on the frequency until a cell selection reception level value of the cell is less than a first predetermined threshold value, or a cell selection quality value of the cell is less than a second predetermined threshold value.

In Example 20, the subject matter of Example 19 may include, wherein the communication device comprises a radio frequency (RF) unit with a single transmitter.

In Example 21, the subject matter of Examples 19-20 may include wherein a second SIM of the communication device is in an active circuit switched (CS) call on 2G or 3G.

In Example 22, the subject matter of Examples 19-20 may include wherein a second SIM of the communication device is in an active voice over LTE (VoLTE) call.

In Example 23, the subject matter of Example 22 may include wherein the VoLTE call is on a different frequency from the frequency on which the first SIM is camped on in idle mode.

In Example 24, a communication device comprising two subscriber identity modules (SIMs); a radio frequency (RF) transmitter; and a baseband modem configured to identify a frequency of a camped cell of the first SIM, assign the frequency a highest priority; and remain on the frequency until a cell selection reception level value of the camped cell is less than a first predetermined threshold value, or a cell selection quality value of the camped cell is less than a second predetermined threshold value.

In Example 25, the subject matter of Example 24 may include wherein the RF transmitter is a single RF transmitter of the communication device.

In Example 26, the subject matter of Examples 24-25 may include the baseband modem further configured to identify an ongoing communication on a second SIM.

In Example 27, the subject matter of Example 26 may include the baseband modem further configured to conduct the ongoing communication on the single transmitter of the communication device.

In Example 28, the subject matter of Examples 24-27 may include the baseband modem further configured to assign the frequency the highest priority irrespective of an information broadcasted by system information blocks (SIBs).

In Example 29, the subject matter of Examples 24-28 may include wherein the first predetermined threshold value is about 3 decibels (dBs) or fewer.

In Example 30, the subject matter of Examples 24-28 may include wherein the first predetermined threshold value is about 5 decibels (dBS) or fewer.

In Example 31, the subject matter of Examples 24-28 may include wherein the second predetermined threshold value is about 3 decibels (dBs) or fewer.

In Example 32, the subject matter of Examples 24-28 may include wherein the second predetermined threshold value is about 5 decibels (dBs) or fewer.

In Example 33, the subject matter of Examples 24-28 may include wherein the first predetermined threshold value and the second predetermined threshold value are the same value.

In Example 34, the subject matter of Examples 24-33 may include the baseband modem further configured to remain on the frequency until the cell selection reception value of the cell is less than the first predetermined threshold value, the cell selection quality value of the cell is less than the second predetermined threshold value, or an identity of another detected cell is on an identity list that the communication device registered with the network, wherein the identity is a tracking area identity (TAI) and the identity list is a TAI list.

In Example 35, a communication device configured to decrease the frequency of tracking area update (TAU) procedures for a first subscriber identity module (SIM) in long term evolution (LTE) idle mode on a network, comprising two SIMs; a radio frequency unit comprising a single transmitter and a plurality of receivers; and a baseband modem configured to assign a frequency of a cell that a first SIM is camped on as a highest priority; and remain on the frequency until a cell selection reception level value of the cell is less than a first predetermined threshold value, or a cell selection quality value of the cell is less than a second predetermined threshold value.

In Example 36, the subject matter of Example 35 may include the baseband modem further configured to identify an ongoing communication on a second SIM.

In Example 37, the subject matter of Example 36 may include the baseband modem further configured to conduct the ongoing communication on the single transmitter of the communication device.

In Example 38, the subject matter of Examples 35-37 may include the baseband modem further configured to assign the frequency the highest priority irrespective of an information broadcasted by system information blocks (SIBs).

In Example 39, the subject matter of Examples 35-38 may include wherein the first predetermined threshold value is about 3 decibels (dBs) or fewer.

In Example 40, the subject matter of Examples 35-38 may include wherein the first predetermined threshold value is about 5 decibels (dBS) or fewer.

In Example 41, the subject matter of Examples 35-38 may include wherein the second predetermined threshold value is about 3 decibels (dBs) or fewer.

In Example 42, the subject matter of Examples 35-38 may include wherein the second predetermined threshold value is about 5 decibels (dBs) or fewer.

In Example 43, the subject matter of Examples 35-38 may include wherein the first predetermined threshold value and the second predetermined threshold value are the same value.

In Example 44, the subject matter of Examples 35-43 may include the baseband modem further configured to remain on the frequency until the cell selection reception value of the cell is less than the first predetermined threshold value, the cell selection quality value of the cell is less than the second predetermined threshold value, or an identity of another detected cell is on an identity list that the communication device registered with the network, wherein the identity is a tracking area identity (TAI) and the identity list is a TAI list.

In Example 45, a non-transitory computer readable medium with program instructions when executed to cause a processor of a communication device with at least one subscriber identity module (SIM) to suppress a cell reselection on a first SIM, comprising identifying a frequency of a cell on which the first SIM is camped on; assigning the frequency a highest priority; and remaining on the frequency until: a cell selection reception level value of the cell is less than a first predetermined threshold value, or a cell selection quality value of the cell is less than a second predetermined threshold value.

In Example 46, the subject matter of Example 45 may include wherein the communication device comprises a radio frequency (RF) unit with a single transmitter.

In Example 47, the subject matter of Examples 45-46 may include an ongoing communication on a second SIM of the communication device.

In Example 48, the subject matter of Example 47 may include comprising the ongoing communication utilizing the single transmitter of the communication device.

In Example 49, the subject matter of Examples 47-48 may include wherein the ongoing communication is a voice call.

In Example 50, the subject matter of Example 49 may include wherein the voice call is on a 2G or 3G radio access network (RAN).

In Example 51, the subject matter of Examples 45-50 may include wherein the first SIM is camped on an LTE cell.

In Example 52, the subject matter of Examples 45-51 may include further comprising assigning the frequency the highest priority irrespective of an information broadcasted by system information blocks (SIBs).

In Example 53, the subject matter of Examples 45-52 may include wherein the first SIM is in an idle mode on the frequency.

In Example 54, the subject matter of Examples 45-53 may include wherein the cell reselection comprises a tracking area (TA) cell reselection.

In Example 55, the subject matter of Example 54 may include wherein the TA cell reselection triggers a TA update (TAU).

In Example 56, the subject matter of Examples 45-55 may include wherein the first predetermined threshold value is about 3 decibels (dBs) or fewer.

In Example 57, the subject matter of Example 45-55 may include wherein the first predetermined threshold value is about 5 decibels (dBS) or fewer.

In Example 58, the subject matter of Example 45-55 may include wherein the second predetermined threshold value is about 3 decibels (dBs) or fewer.

In Example 59, the subject matter of Example 45-55 may include wherein the second predetermined threshold value is about 5 decibels (dBs) or fewer.

In Example 60, the subject matter of Example 45-55 may include wherein the first predetermined threshold value and the second predetermined threshold value are the same value.

In Example 61, the subject matter of Examples 45-60 may include, further comprising remaining on the frequency until the cell selection reception value of the cell is less than the first predetermined threshold value, the cell selection quality value of the cell is less than the second predetermined threshold value, or an identity of another detected cell is on an identity list that the communication device registered with the network, wherein the identity is a tracking area identity (TAI) and the identity list is a TAI list.

In Example 62, the subject matter of Examples 45-61 may include further comprising the frequency of the first SIM being in idle mode for a long term evolution (LTE) evolved radio resource control (eRRC).

In Example 63, the subject matter of Examples 45-62 may include wherein the communication device comprises a single transmitter.

In Example 64, a non-transitory computer readable medium with program instructions when executed to cause a processor of a communication device with at least one subscriber identity module (SIM) to decrease the frequency of tracking area update (TAU) procedures for a first SIM in long term evolution (LTE) idle mode on a network, comprising assigning a frequency of a cell that a first SIM is camped on as a highest priority; and remaining on the frequency until a cell selection reception level value of the cell is less than a first predetermined threshold value, or a cell selection quality value of the cell is less than a second predetermined threshold value.

In Example 65, the subject matter of Example 64 may include wherein the communication device comprises a radio frequency (RF) unit with a single transmitter.

In Example 66, the subject matter of Examples 64-65 may include wherein a second SIM of the communication device is in an active circuit switched (CS) call on 2G or 3G.

In Example 67, the subject matter of Examples 64-65 may include wherein a second SIM of the communication device is in an active voice over LTE (VoLTE) call.

In Example 68, the subject matter of Example 67 may include wherein the VoLTE call is on a different frequency from the frequency on which the first SIM is camped on in idle mode.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device comprising:
   two subscriber identity modules (SIMs);
   a radio frequency (RF) transmitter; and
   a baseband modem configured to:
      identify a frequency of a camped cell of a first SIM of the two SIMs;
      assign the frequency a highest priority; and
      remain on the frequency until a first of the following occurs:
      a cell selection reception level value of the camped cell is less than a first predetermined threshold value,
      a cell selection quality value of the camped cell is less than a second predetermined threshold value, or
      an identity of another detected cell is on an identity list that the communication device registered with the network, wherein the identity is a tracking area identity (TAI) and the identity list is a TAI list.

2. The communication device of claim 1, wherein the RF transmitter is an only RF transmitter of the communication device.

3. The communication device of any one of claim 1, the baseband modem further configured to identify an ongoing communication on a second SIM.

4. The communication device of claim 3, the baseband modem further configured to conduct the ongoing communication on the single transmitter of the communication device.

5. The communication device of claim 1, the baseband modem further configured to assign the frequency a highest priority irrespective of an information broadcasted by system information blocks (SIBs).

6. The communication device of claim 1, wherein the first predetermined threshold value is about 5 decibels (dBS) or fewer.

7. The communication device of claim 1, wherein the second predetermined threshold value is about 5 decibels (dBs) or fewer.

8. The communication device of claim 1, wherein the first predetermined threshold value and the second predetermined threshold value are the same value.

9. A communication device comprising:
   a first SIM and a second SIM;
   a radio frequency unit comprising a single transmitter and a plurality of receivers; and
   a baseband modem configured to:
      identify a frequency of a camped cell of the first SIM; and
      during an ongoing communication for the second SIM, prevent a switch from the camped cell until:
      a cell selection reception level value of the camped cell is less than a first predetermined threshold value, or
      a cell selection quality value of the camped cell is less than a second predetermined threshold value.

10. The communication device of claim 9, the baseband modem further configured to assign the frequency a highest priority irrespective of an information broadcasted by system information blocks (SIBs).

11. The communication device of claim 9, wherein the first predetermined threshold value is about 5 decibels (dBS) or fewer.

12. The communication device of claim 9, wherein the second predetermined threshold value is about 5 decibels (dBs) or fewer.

13. The communication device of claim 9, wherein the first predetermined threshold value and the second predetermined threshold value are the same value.

14. A method for a communication device with at least one subscriber identity module (SIM) to suppress a cell reselection on a first SIM, comprising:
   identifying a frequency of a cell on which the first SIM is camped on;
   assigning the frequency a highest priority; and
   remaining on the frequency until a first of the following occurs:
   a cell selection reception level value of the cell is less than a first predetermined threshold value,
   a cell selection quality value of the cell is less than a second predetermined threshold value, or
   an identity of another detected cell is on an identity list that the communication device registered with the network, wherein the identity is a tracking area identity (TAI) and the identity list is a TAI list.

15. The method of claim 14, wherein the communication device comprises a radio frequency (RF) unit with a single transmitter.

16. The method of claim 14, further comprising an ongoing communication on a second SIM of the communication device.

17. The method of claim 16, further comprising the ongoing communication utilizing the single transmitter of the communication device.

18. The method of claim 16, further comprising wherein the ongoing communication is a voice call.

19. The method of claim 14, further comprising assigning the frequency the highest priority irrespective of an information broadcasted by system information blocks (SIBs).

20. The method of claim 14, further comprising wherein the first SIM is in an idle mode on the frequency.

21. The method of claim 14, further comprising wherein the cell reselection comprises a tracking area (TA) cell reselection.

22. The method of claim 21, wherein the TA cell reselection triggers a TA update (TAU).

23. The method of claim 14, wherein the first predetermined threshold value and the second predetermined threshold value are the same value.

* * * * *